United States Patent
Kim

[11] Patent Number: 5,960,149
[45] Date of Patent: Sep. 28, 1999

[54] VIDEO-CASSETTE RECORDER CAPABLE OF DUBBING HIGH FIDELITY AUDIO SIGNALS

[75] Inventor: Kyu-Yul Kim, Seoul, Rep. of Korea

[73] Assignee: Daewoo Electronics Co., Ltd., Seoul, Rep. of Korea

[21] Appl. No.: 08/740,400

[22] Filed: Oct. 29, 1996

[30] Foreign Application Priority Data

Oct. 30, 1995 [KR] Rep. of Korea .................. 1995-30963

[51] Int. Cl.[6] .................................................... H04N 5/76
[52] U.S. Cl. ............................................ 386/54; 386/63
[58] Field of Search .............................. 386/4, 39, 52–64, 386/96–104; 360/13, 15; 369/83–84; H04N 5/76, 5/92, 9/79

[56] References Cited

U.S. PATENT DOCUMENTS

| | | | |
|---|---|---|---|
| 4,507,688 | 3/1985 | Fujiki et al. | |
| 4,607,293 | 8/1986 | Okada et al. | 386/39 |
| 4,849,817 | 7/1989 | Short | 386/4 |
| 5,181,114 | 1/1993 | Richards et al. | 386/52 |
| 5,194,963 | 3/1993 | Dunlap et al. | 386/39 |
| 5,249,084 | 9/1993 | Hong | 386/54 |
| 5,331,474 | 7/1994 | Lee | 386/54 |
| 5,442,451 | 8/1995 | Hototsumachi | 386/39 |
| 5,479,302 | 12/1995 | Haines | 360/15 |
| 5,481,411 | 1/1996 | Nakatani | 386/54 |

Primary Examiner—Thai Tran
Attorney, Agent, or Firm—Pennie & Edmonds LLP

[57] ABSTRACT

An apparatus dubs input audio signals on a magnetic tape containing prerecorded video and control signals thereon without a loss of the prerecorded video signals. At the apparatus, first video heads reproduces the prerecorded video signals to thereby provide reproduced video signals. Subsequently, the reproduced video signals are regulated at a video processor to thereby provide regulated video signals and an audio processor generates audio dubbing signals based on the input audio signals. Finally, the audio dubbing signals and the regulated video signals are recorded on the tape by audio heads and second video heads, respectively.

20 Claims, 5 Drawing Sheets

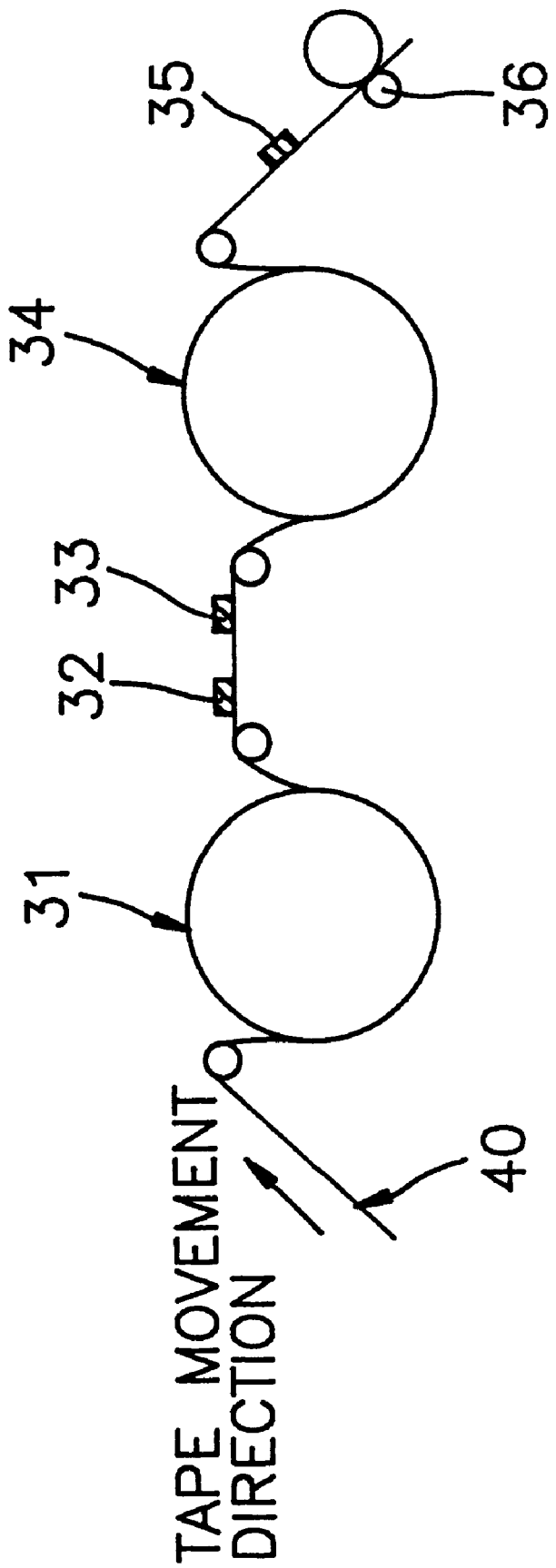

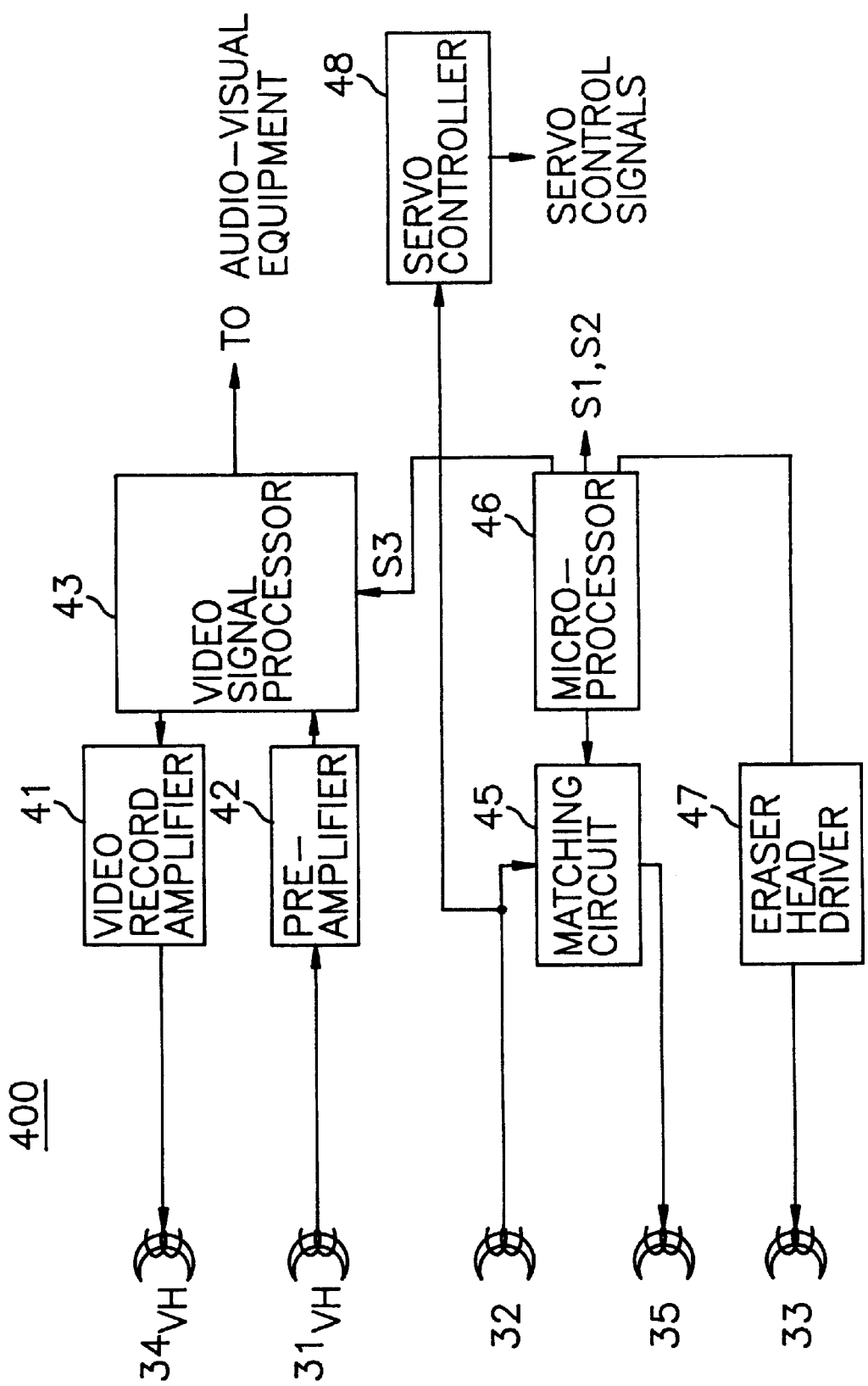

VIDEO-CASSETTE RECORDER CAPABLE OF DUBBING HIGH FIDELITY AUDIO SIGNALS

FIELD OF THE INVENTION

The present invention relates to an apparatus for dubbing audio signals; and, more particularly, to a video cassette recorder capable of recording high fidelity (Hi-Fi) audio signals on a magnetic tape without incurring a loss of video signals prerecorded on the magnetic tape.

DESCRIPTION OF THE PRIOR ART

As is well known, a magnetic tape 10 for use in a Hi-Fi VCR(Video Cassette Recorder), which is recorded, e.g., in the VHS format, has a normal audio track 11 for recording normal audio signals, a video and Hi-Fi audio track 12 for video and Hi-Fi audio recordings and a control track 13 for-recording, e.g., control or time reference signals for servo controlling tape travel and head speeds during a playback and VISS(VHS Index Search System) signals for indexing video signals recorded on the tape 10, as shown in FIG. 1. Among the tracks, specifically, the video and Hi-Fi audio track 12 is helically scanned by the respective heads at a slant angle with respect to a tape movement direction.

Referring to FIG. 2, there is schematically presented a view of the magnetic tape 10 taken along a line A–A' shown in FIG. 1. As illustrated in the drawing, the magnetic tape 10 has a magnetic layer 20 which includes an audio signal recording layer 20A and a video signal recording layer 20B. During a recording operation, Hi-Fi audio signals are recorded first along a scanning direction on the audio signal recording layer 20A by a Hi-Fi audio head 22; and then a video head 24 overwrites video signals on a surface portion of the audio signal recording layer 20A, to thereby provide the video signal recording layer 20B formed on the audio signal recording layer 20A.

Accordingly, in the conventional Hi-Fi VCR's, it is virtually impossible to dub Hi-Fi audio signals on the magnetic tape without destroying the prerecorded video signals thereon.

SUMMARY OF THE INVENTION

It is, therefore, a primary object of the invention to provide an apparatus capable of dubbing Hi-Fi audio signals on a magnetic tape having prerecorded video signals thereon.

In accordance with the invention, there is provided an apparatus for dubbing input audio signals on a magnetic tape having prerecorded video and audio signals and control information, the control information including control signals, which comprises: a first rotary drum having thereon N number of first video heads for reproducing the prerecorded video signals and N number of first audio heads for reproducing the prerecorded audio signals, to thereby provide reproduced video and audio signals, N being a positive integer; a first control head for reproducing the control information to thereby provide reproduced control signals; a video processor, responsive to the reproduced video signals, for regulating the reproduced video signals to thereby provide regulated video signals; an audio processor for generating audio dubbing signals based on the input audio signals and the reproduced audio signals; a second rotary drum having N number of second audio heads and N number of second video heads thereon, wherein the second audio and second video heads record the audio dubbing signals and the regulated video signals, respectively, on the tape; servo controller for providing servo control signals based on the reproduced control signals; and a second control head for recording the servo control signals on the tape.

BRIEF DESCRIPTION OF THE DRAWINGS

The above and other objects and features of the present invention will become apparent from the following description of preferred embodiments given in conjunction with the accompanying drawings, in which:

FIG. 3 schematically shows a head arrangement of a VCR in accordance with the present invention; and FIGS. 4A to 4C offer schematic diagrams of the inventive apparatus for dubbing Hi-Fi audio signals on the magnetic tape.

DETAILED DESCRIPTION OF THE PREFERRED EMBODIMENTS

Figure 1:
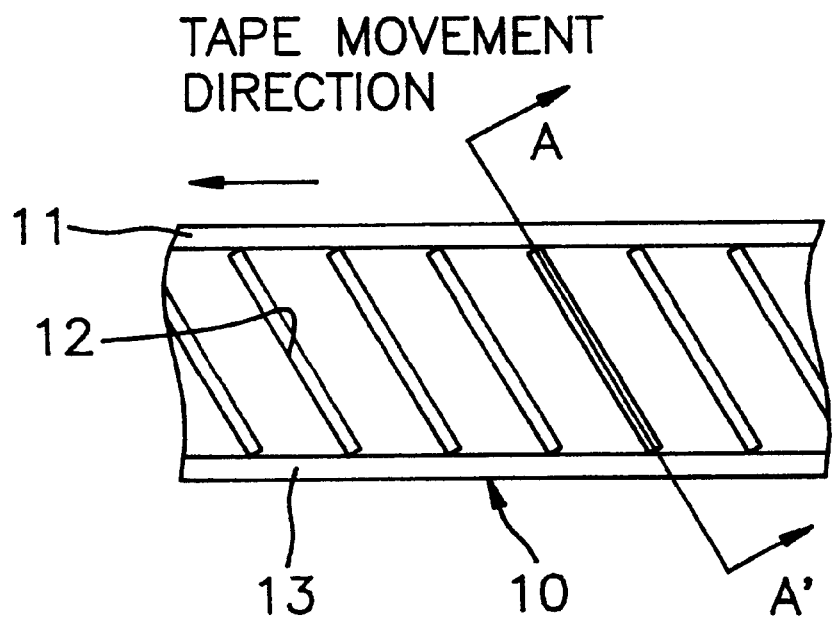
FIG. 1 schematically illustrates a pattern of tracks formed on a magnetic tape.
Figure 2:
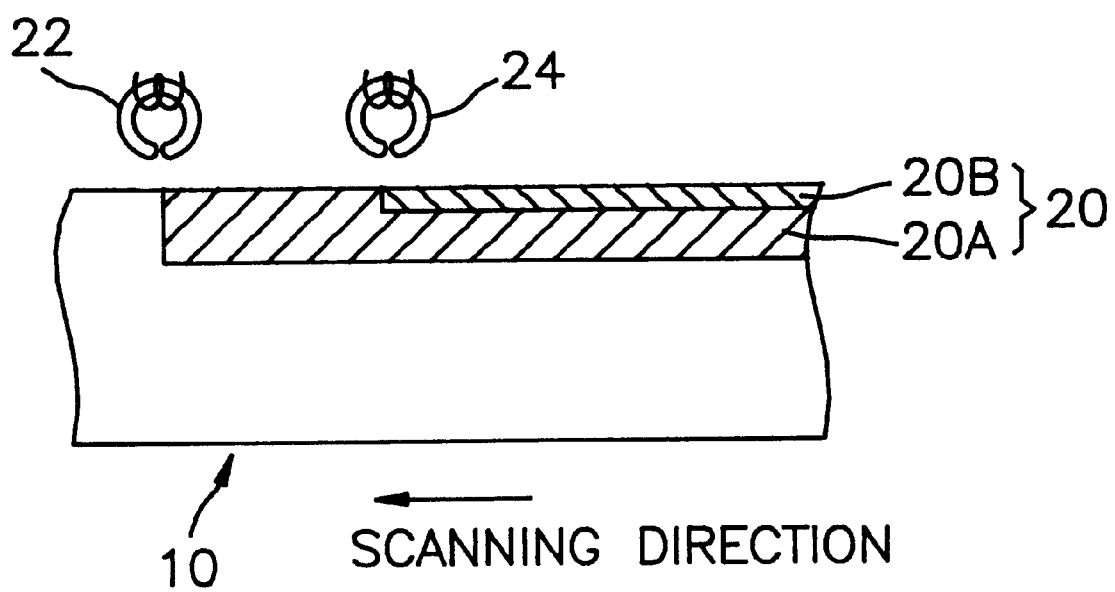
FIG. 2 presents a formation of a video and Hi-Fi audio track along a scanning direction.

Referring to FIG. 3, there is shown a head arrangement 100 of a VCR in accordance with the preferred embodiment of the invention for dubbing Hi-Fi audio signals on a magnetic tape 40 having prerecorded video and Hi-Fi audio signals and control information including, e.g., control signals and VISS signals for indexing the prerecorded video signals.

The head arrangement 100 of the present invention includes a first rotary drum 31 having N number of, e.g., two video reproducing heads and N number of audio reproducing heads with N being a positive integer, a first control head 32 for reproducing the control information from a control track on the magnetic tape 40, an eraser head 33 for erasing all the signals and control information prerecorded on the tape 40, a second rotary drum 34 having a same number of video and audio recording/reproducing heads as the first rotary drum 31, a second control head 35 for recording new control information on the control track or reproducing the prerecorded control information therefrom, and a capstan 36 for regulating a tape movement speed of the tape 40. The video reproducing heads are positioned on the first rotary drum 31 in a predetermined manner, e.g., diametrically opposite each other; and the audio reproducing heads and the video and audio recording/reproducing heads are also disposed on the respective drums 31 and 34 in an identical manner as for the video reproducing heads.

During normal recording and reproduction, the audio and video reproducing heads of the first rotary drum 31 and the first control head 32 are deactivated and the remaining heads and the capstan 36 operate in an identical manner as in the conventional Hi-Fi VCR; and, accordingly, the operational details of the normal recording/reproducing mode will not be described here for the sake of simplicity.

Figure 4B:
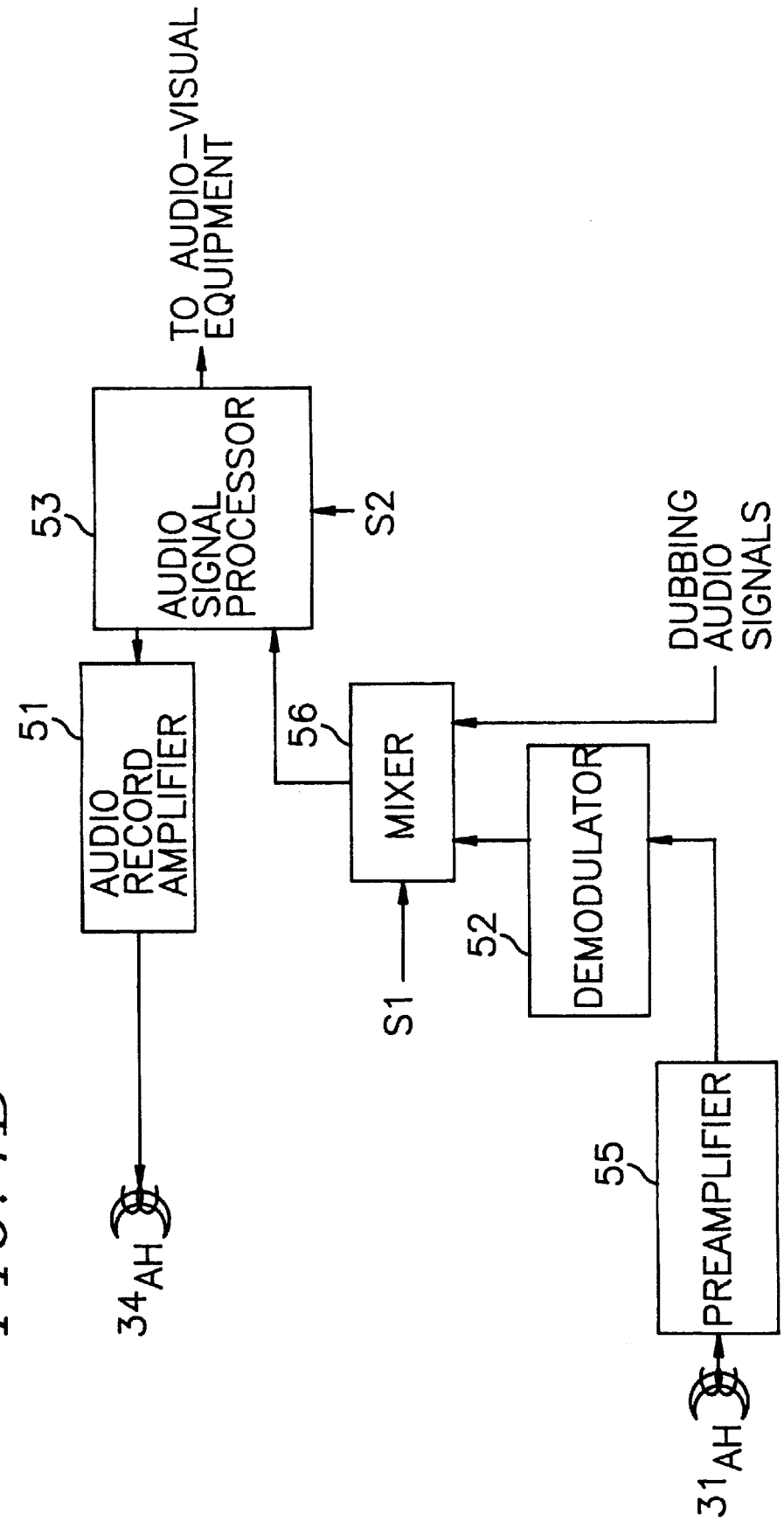

Referring to FIGS. 4A and 4B, there are presented schematic diagrams of the inventive apparatus 400 for dubbing Hi-Fi audio signals on the magnetic tape 40. It should be noted that even though only one of the video reproducing heads is illustrated in FIG. 4A for the sake of simplicity, a head $31_{VH}$ represents N number of video reproducing heads on the first rotary drum 31. Likewise, a video recording/reproducing head $34_{VH}$ shown in FIG. 4A, an audio reproducing head $31_{AH}$ and an audio recording/reproducing head $34_{AH}$ shown in FIG. 4B represent their respective heads.

In the dubbing mode, prerecorded video and Hi-Fi audio signals on the magnetic tape 40 are first reproduced by the video and audio reproducing heads $31_{VH}$ and $31_{AH}$ in the first rotary drum 31, and then the control information prerecorded on the control track of the tape 40 are read out by the first control head 32 as the tape 40 is drawn along the tape movement direction by the capstan 36. The reproduced video and audio signals are provided to preamplifiers 42 and 55, respectively, while the reproduced control information is coupled to a matching circuit 45 and a servo controller 48, wherein the servo controller 48 generates, based on the control signals included in the reproduced control information, servo control signals to provide them to capstan and drum motors(not shown) to thereby servo control the rotary drums 31, 34 and the capstan 48 shown in FIG. 3 during the dubbing mode.

Subsequently, an eraser head driver 47 controlled by a microprocessor 46 drives the eraser head 33 with a high-frequency magnetic field to thereby randomize the magnetization of the tape 40. That is, prerecorded signals and control information contained in a portion of the tape 40 passing by the eraser head 33 are all removed or deleted to thereby generate an erased portion of the tape 40.

The preamplifier 55 preamplifies or regulates the reproduced Hi-Fi audio signals from the audio head $31_{AH}$ such that the levels of the preamplified Hi-Fi audio signals fall within an input range suitable for a demodulator 52. The preamplified Hi-Fi audio signals are then applied to the demodulator 52, wherein the preamplified Hi-Fi audio signals are demodulated and fed to a mixer 56.

The mixer 56 blends, in response to a control signal S1 from the microprocessor 46, the demodulated audio signals from the demodulator 52 and dubbing audio signals inputted thereto by using a conventional signal mixing technique to thereby provide mixed audio signals. That is, the mixed audio signals may be one of the demodulated Hi-Fi audio signals, the dubbing audio signals and mixed signals thereof. The mixed audio signals from the mixer 56 are provided to an audio signal processor 53.

The audio signal processor 53, responsive to a control signal S2 from the microprocessor 46, modulates the output from the mixer 56 and then provides modulated dubbing signals to an audio record amplifier 51 which in turn amplifies the modulated dubbing signals to a range suitable for recording to thereby provide audio dubbing signals. The audio dubbing signals from the audio record amplifier 51 is recorded on the erased portion of the tape 40 by the audio recording/reproducing head $34_{AH}$ of the second rotary drum 34.

On the other hand, the reproduced video signals fed from the video reproducing head $31_{VH}$ of the first rotary drum 31 is preamplified at the preamplifier 42 in a similar manner as in the preamplifier 55 and the preamplified video signals are then fed to a video signal processor 43. At the video signal processor 43, responsive to a control signal S3 from the microprocessor 46, the preamplified video signals are processed into a format suitable for a video record amplifier 41. As in a similar fashion as in the audio record amplifier 51, the processed video signals from the video signal processor 43 are amplified to a suitable range for recording. The amplified video signals are recorded on the tape 40, specifically, on the portion thereof on which the audio dubbing signals have been recorded by the audio recording/reproducing head $34_{AH}$, by the video head $34_{VH}$ of the second rotary drum 34.

In the meanwhile, the matching circuit 45 regulates, under the control by the microprocessor 46, the reproduced control information from the first control head 32 and the regulated control information including, e.g., control signals and VISS signals, is recorded on the erased portion of the tape 40 by the control recording/reproducing head 35.

In the preferred embodiment of the present invention, the preamplified video signals from the preamplifier 42 and the mixed audio signals from the mixer 56 are processed in the video and audio signal processors 43 and 53, respectively, and provided to an audio-visual equipment, e.g., a television set, in order for a user to monitor a dubbing process.

In a second preferred embodiment of the present invention, the first rotary drum 31 shown in FIG. 3 can be constituted not to include the audio reproducing heads thereon. Accordingly, the apparatus 400 shown in FIG. 4B is devoid of the audio reproducing head $31_{AH}$, preamplifier 55, demodulator 52 and mixer 56 and the dubbing audio signals are directly inputted to the audio signal processor 53 as the mixed audio signals.

Figure 4C:
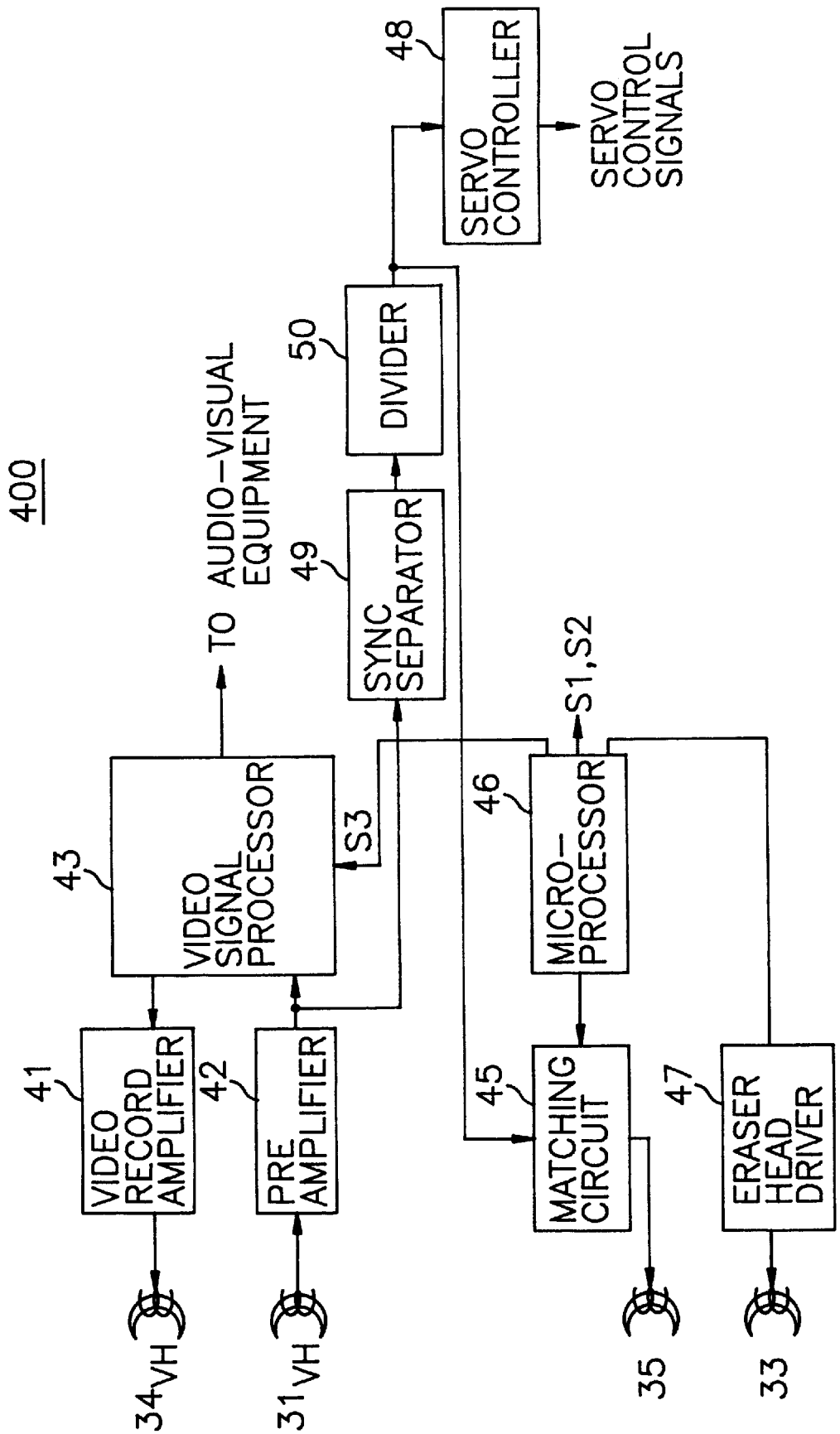

In a third preferred embodiment of the present invention, the inventive apparatus 400 does not include the first control head 32 therein and instead has a synchronization(sync) separator 49 as shown in FIG. 4C. Specifically, the sync separator 49 receives the preamplified video signals from the preamplifier 42 and separates vertical sync signals therefrom. The separated vertical sync signals are then fed to a divider 50 wherein the vertical sync signals, e.g., at 59.84 Hz are divided by 2 to generate divided vertical sync signals having a divided frequency of 29.92 Hz. The divided vertical sync signals are applied to the servo controller 48. The servo controller 48 generates, based on the divided vertical sync signals, servo control signals for servo controlling the rotary drums 31, 34 and the capstan 36. The divided vertical sync signals are also fed, via the matching circuit 45, to the second control head 35 and recorded on the magnetic tape 40.

While the present invention has been described with respect to the particular embodiments, it will be apparent to those skilled in the art that various changes and modifications may be made without departing from the spirit and scope of the invention as defined in the following claims.

What is claimed is:

1. An apparatus for dubbing input audio signals on a magnetic tape having prerecorded video and control signals thereon, which comprises:

a first rotary drum having thereon N number of first video heads for reproducing the prerecorded video signals to thereby provide reproduced video signals, N being a positive integer;

a video processing means for regulating the reproduced video signals to thereby provide regulated video signals;

an audio processing means for generating audio dubbing signals based on the input audio signals; and a second rotary drum having N number of audio heads and N number of second video heads thereon, wherein the audio and the second video heads record the audio dubbing signals and the regulated video signal, respectively, on the tape from which the prerecorded video signals were previously reproduced by the first rotary drum, and wherein the first rotary drum reproduces the prerecorded video signals, before the second drum records the regulated video signals based on the prerecorded video signals.

2. The apparatus as recited in claim 1 further comprising:

means for separating vertical synchronization signals from the reproduced video signals to thereby provide separated vertical synchronization signals;

means, in response to the separated vertical synchronization signals, for generating servo control signals; and a control head for recording the servo control signals on the tape.

3. The apparatus as recited in claim 2 further comprising:

a capstan for regulating the travel speed of the tape; and means for servo controlling the capstan, the first and the second rotary drums based on the separated vertical synchronization signals.

4. The apparatus as recited in claim 1 further comprising:

means for reproducing the control signals to thereby provide reproduced control signals;

means for providing servo control signals based on the reproduced control signals; and means for recording the servo control signals on the tape.

5. The apparatus as recited in claim 4 further comprising:

a capstan for regulating the travel speed of the tape; and means for servo controlling the capstan, the first and the second rotary drums based on the reproduced control signals.

6. The apparatus as recited in claim 1 further comprising an eraser head for erasing the prerecorded video and control signals to thereby provide an erased portion on the tape.

7. The apparatus as recited in claim 6, wherein said audio dubbing signals are recorded on the erased portion to thereby provide an audio signal dubbed portion on the tape and the regulated video signals are recorded on the audio signal dubbed portion.

8. An apparatus for dubbing input audio signals on a magnetic tape having prerecorded video, audio and control signals thereon, the prerecorded video signals containing vertical synchronization signals, which comprises:

a first rotary drum having thereon N number of first video heads for reproducing the prerecorded video signals and N number of first audio heads for reproducing the prerecorded audio signals, to thereby provide reproduced video and audio signals, N being a positive integer;

a video processing means, responsive to the reproduced video signals, for regulating the reproduced video signals and separating the vertical synchronization signals from the reproduced video signals to thereby provide regulated video signals and separated vertical synchronization signals;

means for generating servo control signals based on the separated vertical synchronization signals;

an audio processing means for generating audio dubbing signals based on the input audio signals and the reproduced audio signals;

a second rotary drum having N number of second audio heads and N number of second video heads thereon, wherein the second audio and video heads record the audio dubbing signals and the regulated video signals, respectively, on the tape from which said prerecorded video signals and prerecorded audio signals were previously reproduced by the first rotary drum; and a control head for recording the servo control signals on the tape.

9. The apparatus as recited in claim 8 further comprising an eraser head for erasing the prerecorded video, audio and control signals to thereby provide an erased portion on the tape.

10. The apparatus as recited in claim 9, wherein said audio dubbing signals are recorded on the erased portion to thereby provide an audio signal dubbed portion on the tape.

11. The apparatus as recited in claim 10, wherein the regulated video signals are recorded on the audio signal dubbed portion.

12. The apparatus as recited in claim 9 further comprising:

a capstan for regulating the travel speed of the tape; and means for servo controlling the capstan, the first and the second rotary drums based on the separated vertical synchronization signals.

13. An apparatus for dubbing input audio signals on a magnetic tape having prerecorded video and audio and control information, the control information including control signals, which comprises:

a first rotary drum having thereon N number of first video heads for reproducing the prerecorded video signals and N number of first audio heads for reproducing the prerecorded audio signals, to thereby provide reproduced video and audio signals, N being a positive integer;

means for reproducing the control information to thereby provide reproduced control signals;

a video processing means, responsive to the reproduced video signals, for regulating the reproduced video signals to thereby provide regulated video signals;

an audio processing means for generating audio dubbing signals based on the input audio signals and the reproduced audio signals;

a second rotary drum having N number of second audio heads and N number of second video heads thereon, wherein the second audio and video heads record the audio dubbing signals and the regulated video signals, respectively, on the tape from which said prerecorded video signals and prerecorded audio signals were previously reproduced by the first rotary drum;

means for providing servo control signals based on the reproduced control signals; and means for recording the servo control signals on the tape.

14. The apparatus as recited in claim 13, wherein said number N is 2.

15. The apparatus as recited in claim 14, wherein each pair of the first video and audio heads is disposed diametrically opposite to each other on the first rotary drum and the second video and audio heads are disposed on the second rotary drum in an identical manner as for the first video and audio heads, respectively.

16. The apparatus as recited in claim 13 further comprising an eraser head for erasing the prerecorded video and audio signals and the control information to thereby provide an erased portion on the tape.

17. The apparatus as recited in claim 16, wherein said audio dubbing signals are recorded on the erased portion to thereby provide an audio signal dubbed portion on the tape.

18. The apparatus as recited in claim 17, wherein the regulated video signals are recorded on the audio signal dubbed portion.

19. The apparatus as recited in claim 18, wherein said audio processing means includes:

means for demodulating the reproduced audio signals to provide demodulated audio signals;

means for mixing the demodulated audio signals and the input audio signals to thereby generate mixed audio signals;

means for modulating the mixed audio signals to thereby generate modulated audio signals; and means for providing the audio dubbing signals based on the modulated audio signals.

20. The apparatus as recited in claim 16 further comprising:

a capstan for regulating the travel speed of the tape; and means for servo controlling the capstan, the first and the second rotary drums based on the reproduced control signals.

* * * * *